3,433,752
PROCESS FOR PREPARING RIGID POLY-
URETHANE FOAMS OF OPEN CELL
STRUCTURE
Bonnie L. Zagoren, North Aurora, and Felix H. Otey and
Charles L. Mehltretter, Peoria, Ill., assignors to the
United States of America as represented by the Secretary of Agriculture
No Drawing. Continuation-in-part of application Ser. No. 492,949, Oct. 4, 1965. This application Jan. 4, 1967, Ser. No. 607,151
U.S. Cl. 260—2.5
Int. Cl. C08g 22/44
1 Claim

ABSTRACT OF THE DISCLOSURE

The inclusion of an alkali metal salt of an α-sulfonated higher fatty acid in a one-shot rigid polyether polyurethane formulation also containing a conventional closed-cell surfactant provides a rigid foam in which from about 75 percent to about 99 percent of the cells now exhibit unexpected intercommunicating pores or capillaries, thus making these cells of the open type.

---

This application is a continuation-in-part of application S.N. 492,949, filed Oct. 4, 1965, now abandoned.

A nonexclusive, irrevocable, royalty-free license in the invention herein described, throughout the world for all purposes of the United States Government, with the power to grant sublicenses for such purposes, is hereby granted to the Government of the United States of America.

Brief summary of the invention

We have discovered that the addition of either the preformed salt of an α-sulfonated higher fatty acid or, preferably, sufficient amounts of the α-sulfostearic or α-sulfopalmitic acid to neutralize the alkali-catalyzed glycol glycoside polyether component prior to the "one-shot" foamed reaction of the polyether and polyisocyanate in the presence of a tertiary amine catalyst, and a conventional closed cell-producing silicone-glycol surfactant converts the expected predominantly closed-cell foam into a predominantly open-celled foam in which most of the cells are interconnected by fine pore-like foramina or capillaries, thus providing superior sound-absorbing properties.

Detailed description of the invention

It is well known that, depending on the hydroxyl number of the polyether, flexible, semi-rigid, or rigid polyether polyurethane foams consisting almost entirely of closed cells can be obtained by reacting a long-chain polyether having a plurality of available hydroxyl groups with a polyisocyanate in the presence of a tertiary amine catalyst, an organosilicone type surfactant, and a blowing agent such as a carbon dioxide-generating substance or, preferably, a gaseous polyhalogenated hydrocarbon.

The conventional organosilicone surfactants are relatively soluble in the polyether-polyisocyanate mixture and by promoting a more even mixing of the long-chain polyol and polyisocyanate components, they control the cell wall stability and size, thereby strongly influencing the character of the final foam. The commercially available organosilicone surfactants are generally used in the preparation of low density polyether polyurethane rigid foams in which at least 90–95 percent of the cells are of the closed type. A readily available organosilicone surfactant that is operative in our invention although the surfactant is specifically indicated by the manufacturer as yielding foams containing a very high proportion of closed cells is "DC–113," which is the registered trademark of Dow-Corning Company, Midland, Mich., for the silicone-glycol copolymer that is produced by reacting the allyl ether of a polyethylene glycol with a dimethyl siloxy polymer containing SiH groups in the presence of a catalytic amount of chloroplatinic acid, the generic formula that encompasses the said copolymer being deducible from the formula shown at the top of page 8 of Canadian Patent No. 69,881 to Clyde L. Whipple, issued Sept. 3, 1963, taken in conjunction with the text of the said patent and the manufacturer's published description of the copolymer as having a molecular weight of 1890 and a hydroxyl number of 1.8 percent. Another well known organosilicone surfactant that the manufacturer describes as giving rigid polyurethane foams that are characterized by a great preponderance of closed cells, but whose expected action is completely reversed by the addition of our α-sulfo fatty acid salts is "L–5320 Silicone," which is Union Carbide Company's proprietary name for its low viscosity organosilicone having a hydroxyl number of approximately 170, which liquid organosilicone surfactant and its solid counterpart, designated to the trade as "L–5310," are covered by British Patent No. 1,015,611.

Whereas the prior art conversions of the rigid polyether polyurethane closed-cell foams to predominantly open-celled foams required the subsequent use of such cell-weakening or eroding agents as strong alkali that is difficult to control or the imposition of disruptive physical forces, we have now discovered a direct means for obtaining rigid polyether foams in which the cells are small and highly regular, and in which most of the cells are interconnected by minute pores.

In accordance with our invention it has now been discovered that when alkali salts of α-sulfonated fatty acids are incorporated into a foam-forming mixture comprising a polyether having a hydroxyl number of 350–600 and an organic polyisocyanate and also containing any one of a variety of noncritical commercially available silicone copolymer surfactants, a blowing agent, and an amine activator for the polyurethane-forming reaction, the resulting rigid foams have very small and highly uniform cells and contain a very high percentage of open cells, i.e., cells that are interconnected by very fine openings or foramina. In addition, the foams are of exceptionally low density and have good dimensional stability and compression strength. Such foams can also be made fire resistant by the incorporation of suitable fire retardants in the formulation. Examples of the alkali salts of the α-sulfonated long-chain fatty acids that are operative are the dipotassium and disodium salts of α-sulfostearic acid and α-sulfopalmitic acid or other α-sulfonated fatty acids having a carbon chain length in the range of $C_{14}$ to $C_{22}$. The alkali salts may also be mixed salts such as sodium potassium α-sulfostearate or ammonium potassium α-sulfopalmitate. It is preferred to form the salt in situ by adding enough of the sulfonated fatty acid to neutralize the catalyst such as potassium hydroxide used in preparing the long-chain polyether. Rigid foams prepared with these salts contain from 75 to 99 percent of uniformly fine, pore-containing open cells. This highly specific effect of the alkali salts of the α-sulfonated fatty acids to produce rigid polyether foams having a very high percentage of very fine cells that are open, i.e., interconnected by very fine pores or foramina, is quite unobvious inasmuch as the potassium salts of other sulfonated organic acids such as those of 5-sulfosalicylic acid, sulfoacetic acid, and 4-sulfophthalic acid were found to be completely ineffective for the purpose of the invention and produced rigid foams containing less than 10 percent of open cells. The substitution of sodium lauryl sulfate gave foams containing 22 percent of open cells, whereas with potassium oleate only 5 percent of the cells were open. The proportion of alkali metal salt of the α-sulfonated long-chain fatty acid to be incorporated in the foamable mixture is from 1 percent to 3 percent by weight of the polyethersulfonated fatty acid salt mixture.

As indicated, we prefer to prepare the polyurethane foams of our invention by the well known one-shot method and to form the desired potassium or sodium salt in situ by addition of a neutralizing amount of the free α-sulfonated acid to the polyether preparation containing a known amount of the polyetherification catalyst. However, the preformed α-sulfo fatty acid salts may also be used. Polyoxyalkylene ethers employed in rigid urethane foams are generally made by reacting a polyol such as sorbitol, sucrose, methyl glucoside, or glycol glycosides with propylene oxide in the presence of a catalytic amount of potassium hydroxide or sodium hydroxide. Neutralization of the catalyst after polyetherification with the calculated amount of free α-sulfonated acid to form the neutral salt in situ is preferred since it provides an especially uniform distribution of the surfactant prior to mixing with polyisocyanate for rigid foam formation in accordance with the present invention. The polyurethane-forming reaction may be performed in any convenient manner, the alkali salt of the α-sulfo fatty acid being included in the mix at any convenient stage and being uniformly incorporated therein before the onset of foaming.

Because of their superior acoustical properties, rigid polyurethane foams having very tiny cells, a high proportion of which are interconnected by extremely fine pores, are greatly desired for the effective sound-proofing of audition, hi-fi, and similar rooms. However, as already stated, prior to our discovery, it has been necessary to either physically rupture or chemically "eat away" part of the closed cell wall subsequent to forming the closed cell foam. The former is rather impossible with rigid foams, and the latter gives cells that are highly irregular and too widely open. Our improved foams also have very low densities and good dimensional stability under conditions of high room temperature and humidity, and the rigid slabs can readily be cut into any convenient shape and size for attachment to walls and ceilings. Because of the tendency toward nonuniform cells and the cost of the cell-opening treatment, the prior art rigid foams have not been widely adopted for acoustic purposes. Acoustic tiles usually comprise a mineral wool base held together by a binder, but these tiles suffer from poor dimensional stability and tent to expand, contract, and sag in response to varying temperature and humidity conditions. This not only affects their sound-proofing efficiency, but occasionally leads to their falling from the ceiling.

The invention is illustrated by the following examples.

Example 1

Ethylene glycol (242 ml.; 4.4 moles) and 1.3 g. of concentrated sulfuric acid were mixed at room temperature in a four-necked, 1-liter flask equipped with a stirrer having a glass sleeve and Teflon paddle, a thermometer, downward condenser, and gas inlet tube. Air-dried starch (178.1 g., dry basis) was added with good stirring and the system was flushed with an inert gas. Pressure was reduced to about 25 mm. of Hg and the system was heated with an electric heating mantle. In about 10 minutes the temperature reached 105° C., at which time the suspension became a thick paste or gel. The pressure was adjusted to about 130 mm. of Hg to avoid foaming. After 10 minutes as a gel, the mixture suddenly became a solution of low viscosity. The reaction was continued at 130 mm. and held at 125° to 130° C. for 20 minutes from the time of gel formation. Then the pressure was lowered to 25 mm. for 10 minutes. The system was adjusted to atmospheric pressure with nitrogen, and enough powdered barium hydroxide (4.3 g. of $Ba(OH)_2 \cdot 8H_2O$) was added to neutralize the sulfuric acid. Powdered potassium hydroxide (3.48 g., i.e., 2 percent based on the starch) was added as the etherification catalyst. Unreacted glycol was removed from the glycoside mixture at pressure of 1 to 5 mm. of Hg as the temperature was raised to 150° C. The increase in weight of the flask contents indicated the presence of 0.79 to 0.81 mole of ethylene glycol per anhydroglucose unit.

The reaction flask containing the crude glycoside was then equipped with air condenser connected to an outlet mineral oil bubbler, a long-stemmed dropping funnel with an available nitrogen bypass, a thermometer and a stirrer. After the system had been purged with nitrogen, and the temperature raised to 170° C., propylene oxide was added dropwise. As the reaction progressed, the rate increased so rapidly that it was necessary to gradually lower the temperature to 150° C. A total of 6.9 moles of propylene oxide was added per gram weight of anhydroglucose units to produce 678.8 g. of a glycol glycoside polyether having a hydroxyl number of 419 and also containing 3.48 g. of uncombined KOH. The alkali was neutralized by adding 11.30 g. of α-sulfostearic acid with stirring for 30 minutes at 100° C. to remove the volatiles, and a portion of the neutralized polyether intermediate was then used as follows:

A rigid, fire resistant foam was prepared by the one-shot technique by blending 46.66 g. of the neutralized glycol glycoside polyether product with 16.84 g. of commercially obtained O',O-diethyl-N,N-bis(2-hydroxyethyl) aminomethylsulfonate fire retardant, 0.55 g. of triethylenediamine, 3 drops of dibptyl tin dilaurate, 0.65 g. of dimethylethanolamine, 1.3 g. of the first of the herein described trade marked silicone-glycol closed cell surfactants, and 22.30 g. of fluorotrichloromethane, and then rapidly mixing this premixture with 67.68 g. of polymethylene polyphenylisocyanate. In just under 2 minutes the resulting mixture formed a rigid foam consisting of extremely small, highly uniform cells of which 94 percent were found to have an open structure. The foam had good dimensional stability after saturated humidity aging at 70° F. for 4 weeks. Bulk density of the foam was 1.70 lb./cu. ft.: compression strength was 22 p.s.i. parallel.

Example 2

202.2 g. of a proprietary polyoxypropylene ether of sorbitol characterized by a hydroxyl number of 494, was treated with a solution of alcoholic potassium hydroxide (1.043 g. of KOH) and then neutralized by addition of a warmed alcohol solution containing 3.391 g. of α-sulfostearic acid. After vacuum removal of volatiles, the mixture contained 4.099 g. of potassium α-sulfostearate equivalent to 1.99 percent by weight of the polyether-salt mixture.

Then 8.84 g. of the above mixture was blended with 0.03 g. of triethylenediamine, one drop dibutyl tin dilaurate, 0.03 g. of dimethylethanolamine, 0.19 g. of the same silicone-glycol copolymer used in Example 1, and 3.34 g. of fluorotrichloromethane blowing agent, and this premixture in turn was rapidly mixed with 10.67 g. of polymethylene polyphenylisocyanate. The resulting mixture was poured into an open mold and foamed to a rigid cellular mass that had a density of 2 lbs./cu. ft. The foam consisted of very uniform, very fine cells, 99 percent of which were found to be of the open type. The dimensional stability of the foam was satisfactory on saturated humidity ageing, as in Example 1.

Example 3

To 6.93 g. of the same polyoxypropylene ether of sorbitol used in Example 2 was added 0.14 g. of preformed dipotassium α-sulfopalmitate, and the whole mixed well at 60° C. The surfaced polyether was then blended with 0.07 g. of triethylenediamine, 1 drop of dibutyl tin dilaurate, 0.08 g. of dimethylethanolamine, and 0.16 g. of the same silicone-glycol copolymer used in the previous examples, plus 2.68 g. of fluorotrichloromethane, and the whole then mixed rapidly with 8.67 g. of polymethylene polyphenylisocyanate. The resulting mixture was poured into an open mold where it foamed to a cellular rigid mass. A uniform fine-celled structure was obtained of which 75 percent of the cells were of the open type. Density of the foam was 2 lbs./cu. ft.

Example 4

To 678.8 g. of the same glycol glycoside polyoxypropylene ether of Example 1, but containing 2.5 g. of sodium hydroxide catalyst in place of the potassium hydroxide, were added 11.30 g. of α-sulfostearic acid, the mixture stirred 30 minutes at 100° C., and the volatiles removed.

Then 9.63 g. of the above mixture was blended with 0.08 g. triethylenediamine, 1 drop dibutyl tin dilaurate, 0.01 g. dimethylenethanolamine, 0.20 g. of the same silicone-glycol copolymer used in the previous examples, and 3.35 g. of fluorotrichloromethane, and the whole then rapidly mixed with 10.06 g. of polymethylene polyphenylisocyanate. The resulting mixture was poured into an open mold and foamed to a rigid mass. The foam had a fine, uniform cell structure, 95 percent of the cells of which were found to be open.

Example 5

250.0 g. of a proprietary symmetrical propylene oxide polyether of sucrose having a hydroxyl number of 410, were treated with a solution of alcoholic potassium hydroxide (1.420 g. of KOH) and neutralized at 60° C. with an alcoholic solution containing 4.616 g. of α-sulfostearic acid. After vacuum removal of the volatiles, the mixture contained 5.580 g. of potassium α-sulfostearate or 2.18 percent based on the polyether-salt mixture.

Then 64.09 g. of above mixture was blended with 0.70 g. of triethylene diamine, 4 drops of dibutyl tin dilaurate, 0.70 g. dimethylethanolamine, 1.3 g. of the same silicone-glycol closed cell surfactant used in the previous examples, and 22.36 g. of fluorotrichloromethane, and this premixture then rapidly mixed with 67.26 g. of polymethylene polyphenylisocyanate. The resulting mixture was poured into an open mold and foamed to a rigid cellular mass that had a density of 2 lbs./cu. ft. The polyurethane foam had a very fine cell structure, 75 percent of the cells being found to possess intercellular pores and thus were of the open type.

Example 6

58.33 g. of a different lot (hydroxyl number 492) of the commercially obtained polyoxypropylene ether of sorbitol of Example 2 was similarly treated with additions of alcoholic KOH and of α-sulfostearic acid to provide 2.59 g. (4.44%) of in situ potassium α-sulfostearate. After removing the volatiles, the remaining mixture (61.0 g.) was blended with 0.65 g. of dimethylethanolamine, 3 drops dibutyl-tin dilaurate, and, in place of the previously used proprietary surfactant, 1.3 g. (0.98%) of the second of the herein described closed cell surfactants which is characterized by the manufacturer as having a viscosity of 40 cstks. at 25° C., a sp. gr. of 1.07, and a hydroxyl number of about 170, and 22.33 g. of fluorotrichloromethane. To the resulting premix was added 71.67 g. of polymethylene polyphenylisocyanate. The mixture was foamed in an open mold, and sections made after 4 days of curing showed that the cells were very small and highly regular and that a statistically reliable 97.6 percent of them were of the open type. The foam had a density of 1.85 lbs./cu. ft. and a compression resistance value of 15.9 lbs./sq. in. Obviously, the precise chemical structure of the organosilicone closed cell surfactant is not critical to the operativeness of our invention. On the other hand, an identical preparation excepting for the omission of the potasium α-stearate component gave a foam which contained only 3.4 percent of open cells.

Example 7

A rigid foam similar to that of Example 1 but not containing the fire retardant was prepared by treating 62.94 g. of the same glycol ether glycoside (hydroxyl number 419) with sufficient α-sulfopalmitic acid and neutralizing amount of NaOH to provide a 1.00% content of in situ acid salt following removal of the volatiles. There were successively added to the salt-containing polyether 0.55 g. of triethylendiamine, 3 drops of dibuty-tin dilaurate, 0.65 g. of dimethylethanolamine, 1.3 g. of the same surfactant used in Example 6, and 22.33 g. of fluorotrichloromethane. Then 67.06 g. of polymethylene polyphenylisocyanate was rapidly mixed into the preceding mixture, and the stirred material allowed to foam as in the preceding examples. The cured foam had an average density of 1.75 lbs./cu. ft., a compression strength of 13.7 lbs./sq. in., and a 93.1 percent content of open cells.

We claim:
1. A process for directly forming low density rigid polyether polyurethane foams characterized by very small and highly uniform cells, 75 percent to about 99 percent of which cells are further characterized by the presence of open pores, said process comprising
 (a) adding a neutralizing amount of an α-sulfonated fatty acid selected from the group consisting of α-sulfopalmitic acid and α-sulfostearic acid to a polyol-derived polyoxyalkylene polyether having a hydroxyl number of about 400–500, containing about 0.5 percent based on the weight of the polyether of an alkali metal hydroxide selected from the group consisting of sodium hydroxide and potassium hydroxide,
 (b) reacting the polyether containing admixed therewith 1 to 3 percent based on the weight of the polyether of the resulting α-sulfonated fatty acid alkali metal salt with polymethylene polyphenylisocyanate in the presence of a polyfluorocarbon blowing agent, a tertiary amine catalyst, and a low-viscosity, liquid, silicone-glycol copolymer surfactant.

References Cited

UNITED STATES PATENTS

| 2,577,280 | 12/1951 | Simon et al. | 260—2.5 |
| 3,210,300 | 10/1965 | Leibu et al. | 260—2.5 |
| 3,288,732 | 11/1966 | Chapman et al. | 260—2.5 |

DONALD E. CZAJA, *Primary Examiner.*

M. B. FEIN, *Assistant Examiner.*